3,081,472
AUTOMATIC INJECTOR FOR PIPE LINE
CLEANERS
Willem L. M. van Dijk, Calgary, Alberta, Canada, assignor to Robin-Nodwell Mfg. Ltd., Calgary, Alberta, Canada
Filed Mar. 2, 1961, Ser. No. 92,849
Claims priority, application Canada Sept. 23, 1960
2 Claims. (Cl. 15—104.06)

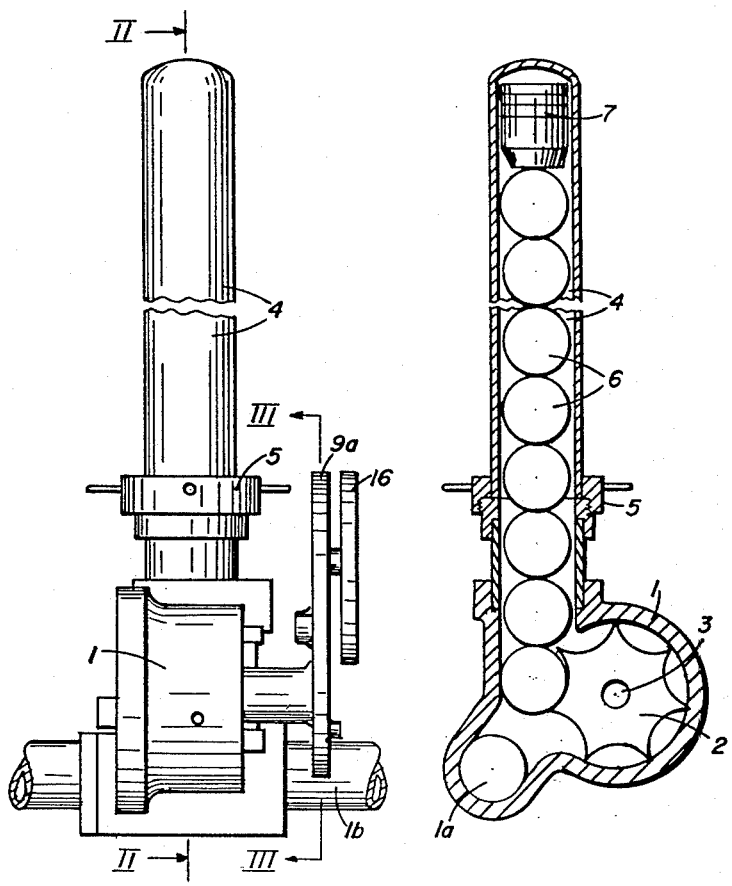

This invention relates to the cleaning of pipe lines. Pipe lines are commonly cleaned by inserting scrapers such as sponges, scrubbing balls or plugs into the pipe line flow for removal of material which has built up around the inner circumference of the pipe.

It is an object of the present invention to provide means for injecting balls or the like into a pipe line automatically, at predetermined intervals.

Apparatus according to the invention comprises means for feeding a series of pipe scrapers to a toothed feed means and exerting a rotary force thereon and means for locking said feed means against rotation except at predetermined intervals, said toothed feed means being adapted to feed the scrapers into a pipe line.

In one embodiment of the invention, apparatus for feeding scrapers into a pipe line comprises a fluid tight housing in combination with a magazine connected thereto, a vertical column of scrapers within said combination, a weight on the uppermost scraper, a shaft in said housing, a rotary toothed feed wheel within said housing, mounted on said shaft and having its pitches corresponding substantially to the scrapers, a gear wheel mounted on said feed wheel shaft, a trip lever mounted on a shaft which is laterally spaced from the parallel to said feed wheel shaft and has a gear wheel adapted to mesh with said first gear wheel, a driven wheel having notches which are adapted to trip said trip lever, and timing means to control the rotation of said notched wheel.

One embodiment of the invention will now be described by way of example, with reference to the accompanying drawings, in which:

FIGURE 1 is a front elevation of the scraper injection apparatus;

FIGURE 2 is a sectional side elevation along the line II—II of FIGURE 1;

Figure 3:
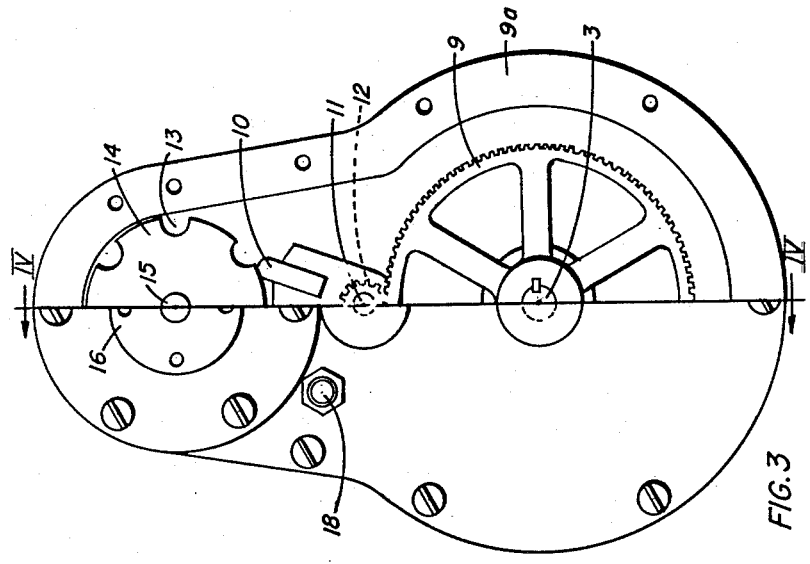
FIGURE 3 is a part sectional side elevation along the line III—III of FIGURE 1.

Referring to the drawings, a housing 1 contains a toothed feed wheel 2 mounted on a shaft 3. The housing 1 includes a pipe line section 1a adapted to be interposed in a pine line 1b to be cleaned. Shaft 3 extends through a side wall of the main housing 1. A magazine 4 is connected to the housing 1 preferably by means of a hammer union 5. A vertical column of scrapers 6 within the ejector apparatus, together with a weight 7 on the uppermost scraper, exert a turning force on the wheel 2 which has its pitches corresponding to the scrapers 6. A gear wheel 9 in the gear housing 9a is mounted on the shaft 3. A trip lever 10 mounted on a shaft 11 has a gear wheel 12 meshing with the first gear wheel 9. Trip lever 10 is adapted to be tripped by notches 13 of a notched wheel 14 mounted on a shaft 15. A hub 16 is mounted at one end of shaft 15. Timing means is attached to hub 16 and drives notched wheel 14 at a predetermined speed of rotation. The timing means may be of any known type, such as a spring powered clockwork mechanism sometimes called a chart drive and, since the construction thereof forms no part of the present invention, it will not be described herein.

In preparation for operation, magazine 4 is first removed and inverted to receive weight 7 and scrapers 6. The housing 1 is loaded with scrapers 6, the first of which nestles between two teeth of feed wheel 2. Subsequent thereto, magazine 4 is replaced on the housing 1. Feed wheel 2 has a rotary force exerted thereon by the weight of the vertical column of scrapers and weight 7. Feed wheel 2 is locked against rotation by the trip lever 10 engaging the outer periphery of wheel 14, thus locking gears 9 and 12, until said lever 10 is tripped by a notch 13. Gear wheel 9 is now free to rotate under the force exerted by the weight 7 and scrapers 6 on feed wheel 2 and will, in turn, rotate gear wheel 12 until lever 10 again engages the outer periphery of wheel 14. Thus, each time a notch 13 trips lever 10 the gear wheel 9 will rotate a predetermined amount depending on the gear ratio of gears 9 and 12. The frequency of such rotational steps is, of course, determined by the speed at which notched wheel 14 is driven by its associated timing means and by the number of notches 13 provided on wheel 14.

In a typical example the ratio of gears 9 and 12 is 7:1 and the wheel 14 is provided with seven notches 13 and driven at a speed of 1 revolution every seven days. Feed wheel 2 has seven pitches and thus one ball will be inserted into the pipe line every day. If a different frequency of scraper injection is desired the wheel 14 may be removed and replaced by another notched wheel having a different number of notches 13.

Figure 4:
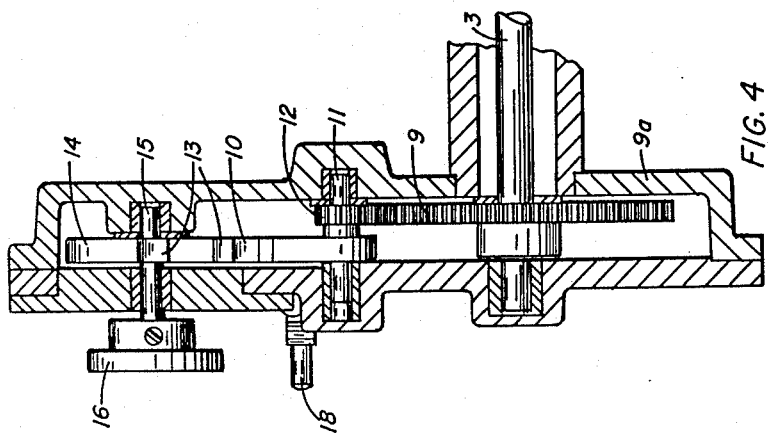
FIGURE 4 is a section on the line IV—IV of FIGURE 3.

As shown in FIGURES 3 and 4, a stud 18 is provided for locking the trip lever 10 against rotation when it is desired to discontinue injection of the scrapers 6 into the pipe line. Thus, stud 18 is adapted to be placed in and removed from the path of trip lever 10.

It will be appreciated that other embodiments of the invention can be envisaged without departing from the scope of the present invention. For example, although in the embodiment described above the rotary force exerted on the feed wheel 2 is supplied by gravity, there may be a spring or the like provided for this purpose. Thus, the feed wheel 2 may be mounted on a vertical axis and the series of scrapers fed horizontally thereto by a spring acting on the rear scraper of the series. However, the gravity feed is, of course, simpler and more satisfactory.

What I claim as my invention is:

1. Apparatus for feeding pipe scrapers into a pipe line comprising a fluid-tight housing in combination with a magazine connected thereto, a vertical column of scrapers within said combination, a weight on the uppermost scraper, a shaft in said housing, a rotary toothed feed wheel within said housing, mounted on said shaft and having its pitches corresponding substantially to the scrapers, a gear wheel mounted on said feed wheel shaft, a trip lever mounted on a shaft which is laterally spaced from and parallel to said feed wheel shaft and has a gear wheel adapted to mesh with said first gear wheel, and a constantly driven wheel having notches which are adapted to trip said trip lever.

2. Apparatus for feeding pipe scrapers into a pipe line comprising a cylindrical section adapted for interposition in a pipe line to be cleaned, a magazine for scrapers, a toothed feed wheel pitched to correspond with the scrapers and situated to feed scrapers from said magazine to said cylindrical section, means for urging the scrapers in said magazine tangentially toward said feed wheel to engage the teeth thereof with sufficient force to rotate the feed wheel, a gear train arranged to control the rotation of the feed wheel, a trip lever, said gear train being controlled by said trip lever, and a driven notched wheel adapted to trip said lever at predetermined intervals.

References Cited in the file of this patent

UNITED STATES PATENTS

| | | |
|---|---|---|
| 953,739 | Duncombe | Apr. 5, 1910 |
| 2,138,232 | Giannini | Nov. 29, 1938 |
| 2,915,422 | Stone | Dec. 1, 1959 |